Dec. 26, 1961     E. W. AYLOR     3,014,608
CHICKEN COOP

Filed May 13, 1960     2 Sheets-Sheet 1

INVENTOR
*Eugene W. Aylor*

BY *Mason, Fenwick & Lawrence*
ATTORNEYS

Dec. 26, 1961 E. W. AYLOR 3,014,608
CHICKEN COOP
Filed May 13, 1960 2 Sheets-Sheet 2
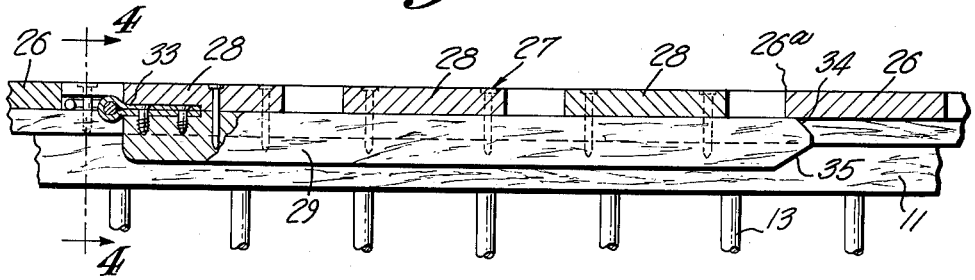
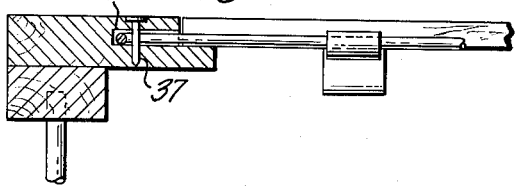
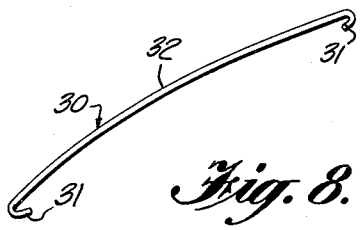
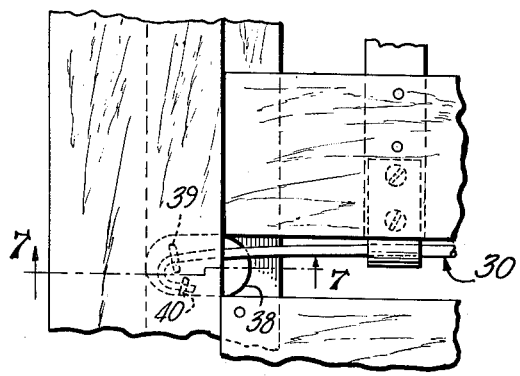
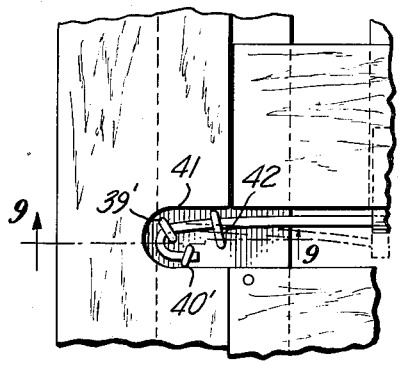
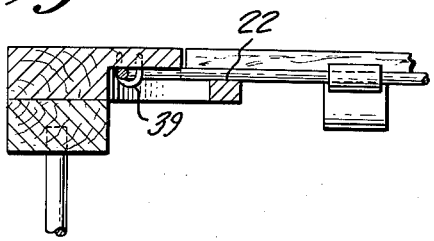
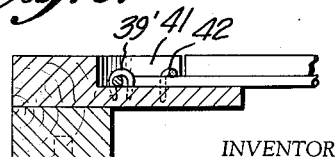
INVENTOR
*Eugene W. Aylor*
BY *Mason, Fenwick & Lawrence*
ATTORNEYS United States Patent Office 3,014,608
Patented Dec. 26, 1961

3,014,608
CHICKEN COOP
Eugene W. Aylor, Brightwood, Va.
Filed May 13, 1960, Ser. No. 29,003
8 Claims. (Cl. 217—36)

The present invention relates in general to poultry coops, and more particularly to coops used for transportation of poultry having resiliently latched doors incorporated therein.

It is conventional practice in storing coops in or on transportation vehicles for delivery to market to pile such coops in tiers of considerable height. In stacking and removing coops from the upper rows of such tiers, the attendants usually stand on one or several coops in tiers adjoining those from which the coops are being removed or stacked. By reason of the rough handling to which these coops are subjected during such stacking, they must be extremely rigid in construction and able to withstand the attendant strains and shocks.

According to conventional construction practice, coops of this type are usually formed in a rectangular shape with the side and end walls formed of spaced dowels so that a maximum quantity of air is admitted to the area occupied by the poultry and at the same time substantial strength is provided in the construction to resist the downward force of a large number of such coops piled one upon the other.

Such commercial poultry coops for transporting poultry are usually made of wood, this being the most economical and generally desirable construction material for this type of container. When the wood poultry coops are stacked in tiers on the truck bed for transportation, the coops are secured in the stacked relation by means of chains or cables drawn tightly over the group of stacked coops. Ordinarily, the chains or cables have direct contact with the upper marginal wood members of the uppermost poultry coops in the vertical stacks of coops along the lateral edges of the truck bed. While this is not particularly harmful to the lower coops in the stacks or tiers of coops, the chains or cables frequently produce rapid destruction of the wood members of the coops in immediate contact therewith due to the wear of the chain links on these wood members when the chains are drawn over the rails to fasten the coops and due to the crushing and abrading effects of the chains or cables during transportation.

For convenience in filling and emptying the coops, a pivoted door is usually provided in the top of the coop which is resiliently biased to latched condition. An important feature of such hinged doors, however, is that the door may be readily opened by the attendant by the use of one hand and when opened will remain in open position, and that they may be readily closed and automatically latched by merely impelling the door toward the closed position about its hinge. Such latching arrangement, however, must be efficient and positive in operation to prevent escape of other poultry from the coop. Also, failure to securely close the hinged door exposes the coop to almost certain injury in the course of shipment.

An object of the present invention, therefore, is the provision of poultry coops of the type referred to having an improved construction permitting them to better withstand the stresses and strains imposed on the coop structure during loading and transportation of the same and to withstand for longer periods of time the destructive effect of binding chains and cables.

Another object of the present invention is the provision of a novel poultry coop construction of hinged door type involving substantial reduction in the time and labor required to assemble the coop.

Another object of the present invention is the provision of an improved hinged door poultry coop construction having means to facilitate assembly and effective retention of the door supporting spring in position in the top of the coop.

Other objects, advantages and capabilities of the present invention will become apparent from the following detail description, taken in conjunction with the accompanying drawings illustrating a preferred embodiment of the invention and several embodiments of means for assembling the hinged door supporting spring in the coop.

In the drawings:

FIGURE 3 is a fragmentary vertical longitudinal section view taken along the line 3—3 of FIGURE 2;

FIGURE 4 is a fragmentary vertical transverse section view taken along the line 4—4 of FIGURE 3;

FIGURE 5 is a perspective view of the door-supporting spring for supporting the hinged door in the top of the coop;

FIGURE 6 is an enlarged fragmentary plan view of the top portion of the poultry coop in the zone of attachment of the door-supporting spring to a top side rail, illustrating a modified construction for mounting the door spring to the top side rail;

FIGURE 7 is a vertical transverse section view taken along the line 7—7 of FIGURE 6;

FIGURE 8 is an enlarged fragmentary plan view of the top portion of the poultry coop in the zone of attachment of the door-supporting spring to a top side rail, illustrating a further modification of the construction for mounting the door spring to the top side rail; and FIGURE 9 is a vertical transverse section view taken along the line 9—9 of FIGURE 8.

Figure 1:
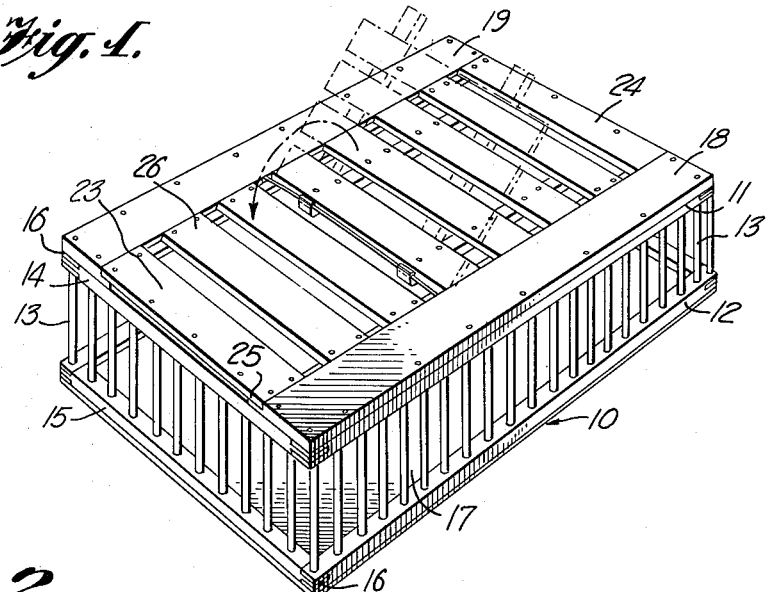
FIGURE 1 is a perspective view of a poultry coop constructed in accordance with the present invention.

Referring to the drawings wherein like reference characters designate corresponding parts throughout the several figures and particularly to the form shown in FIGURES 1 to 5 inclusive, the poultry coop constructed in accordance with the present invention, indicated generally by the reference character 10, is of generally rectangular configuration having vertical sides formed of longitudinal top and bottom dowel frame members 11, 12 between which vertical parallel dowels 13 extend, and ends having transverse top and bottom dowel frame members 14, 15 between which like vertical, parallel dowels 13 extend. The dowel frame members 11, 12, 14 and 15 are interconnected at the corners of the coop by the usual mortise and tenon joints, indicated by the reference character 6, and a bottom 17 formed of plywood or like thin material is secured to the bottom dowel frame members 12 and 15 in underlying relation thereto.

In the usual poultry coop construction heretofore practiced, the top of the coop was customarily formed by extending a number of thin batten strips transversely or crosswise of the coop with their ends overlapping the top side dowel frame members, which are secured in place by thin marginal capping strips at each side of the coop overlying the top side dowel frame members and additional inwardly spaced capping strips extending parallel to the marginal capping strips and bounding the top door opening, each of the capping strips being nailed to each transverse or cross strip a number of times. Further, door supporting sticks or strips extend longitudinally of such coops between the top end rails or dowel frame members along the sides of the door opening and underlying the cross strips with a portion of the door-supporting sticks projecting into the door opening to form a shelf on which the door rests when the door is in closed condition. It will be appreciated that an extensive amount of labor is involved in the nailing operation in assembling poultry coops in this manner and that the inherent weakness of the marginal capping strips renders them readily destructible in a relatively short period of time under the crushing or abrading forces of the binding chain links employed to bind such coops in stacked tiers for transportation.

The disadvantages attendant to this earlier type of construction have been largely alleviated by the top construction herein disclosed. The novel top construction illustrated in the accompanying drawings includes a pair of relatively wide top side rails 18, 19 of sufficient width to extend from the sides of the coop to the lateral edges of the top door opening indicated by the reference character 20 and having their outer edges in vertical alignment with the outer edges of the top side frame members 11, and their end edges aligned with the outer edges of the transverse top frame members 14. In one practical commercial embodiment of this invention, wherein the dowel frame members 11, 12, 14 and 15 are formed of 1" x 1" stock, the top side rails 18, 19 may be formed of 1" x 5" or 1" x 4" lumber. The inwardly facing edges of each of the top side rails 18, 19 are stepped to provide a rabbet 21 along the upper inner corner, providing an inwardly projecting ledge 22 extending uninterruptedly along the entire length of the top side rails. A pair of top end rails 23 and 24 extend transversely of the coop between the top side rails 18, 19 at the opposite ends of the coop and overlying the transverse top frame members 14, the top end rails 23, 24 also having rabbet-like formations 25 at their opposite ends to mate with the rabbets 21 along the top side rails 18, 19. The top end rails 23, 24 may be each formed of a single piece of 1" x 4" lumber milled along its opposite ends to provide the rabbet-like formations 25 or may be formed of superimposed pieces of lumber, the uppermost piece being formed of ½" x 4" lumber of appropriate length to extend between the bases of the rabbets 21 along the top side rails 18, 19 and the lower piece being formed of ½" x 1" lumber of shorter length to butt against the inwardly facing edges of the ledges 22 of the rabbets 21. Intermediate cross pieces 26, formed for example of ½" x 4" lumber, are also fixed in longitudinally spaced, parallel relation to the top end rails 23, 24 with their ends resting upon the ledges 22 of the rabbets 21.

A door 27 is designed to occupy the door opening framed by the top side rails 18, 19 and the adjacent transverse cross pieces 26, the door being formed of a plurality of transverse strips 28 similar to the intermediate cross pieces 26 but of slightly shorter length to space the ends of the door strips 28 from the bases of the rabbets 21 while the end portions of the strips 28 rest upon the ledges 22, the door strips 28 being fixed in parallel relation to each other by door frame members 29 extending longitudinally of the coop. The door 27 is hingedly supported for opening and closing movement relative to the top of the coop by means of an elongated door spring 30 of rather thick flexible wire which terminates at opposite ends in hook formations 31 and is bowed slightly throughout its extent between the hook formations 31, as indicated at 32. The door 27 is coupled to the bowed region 32 of the door spring 30 for pivotal movement about the door spring by means of hinge strap members 33, the bent portion of which extends around the door spring 30 and the end portions of which are lapped over each other and secured between the adjacent door strip 28 and the door frame member 29. The opposite ends of the door frame members 29 are beveled as revealed clearly in FIGURE 3 to provide a relatively shallow top bevel 34 and a bottom bevel 35, in accordance with conventional practice, the bottom bevel 35 being adapted to coact with the upper corners of the edge 26a of the cross piece 26 bounding the side of the door opening opposite the hinge to force the door spring 30 to the left as viewed in FIGURE 3 by camming action when the door 27 is impelled in a closing direction and the top bevel 34 being adapted to coact with the bottom corner of the edge 26a to cam the free end of the door to fully shut position.

Figure 2:
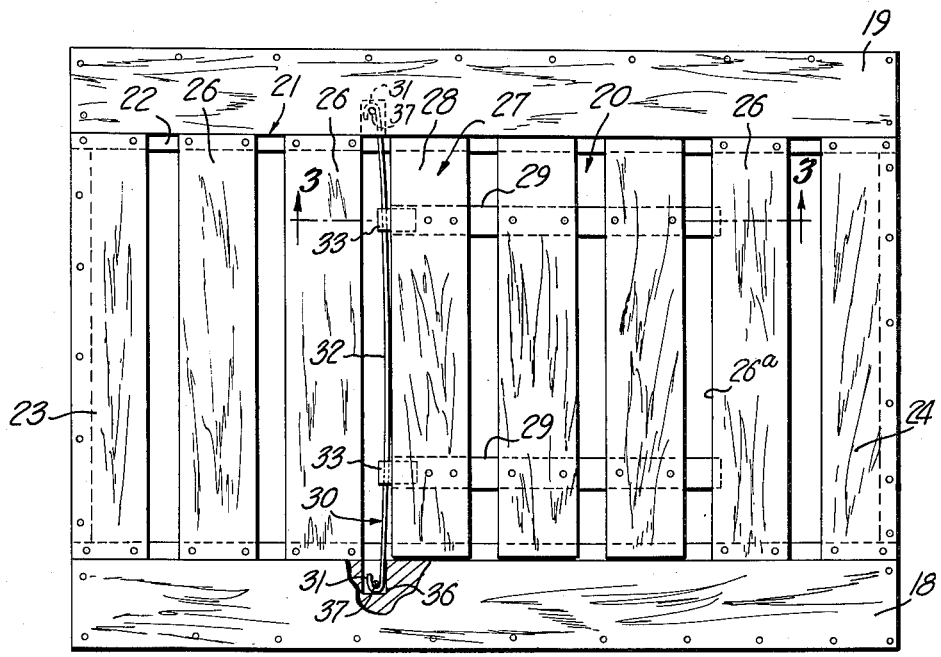
FIGURE 2 is a top plan view of the poultry coop, with portions broken away adjacent the connection of the hinged door supporting spring with one top side rail of the coop.

There is illustrated in FIGURES 2, 3 and 4 one construction for assembling the hooked ends 31 of the door spring 30 with the top side rails 18, 19 in a manner which will facilitate accurate placement and anchoring of the door spring on the top side rails 18, 19 and securely hold the door spring against upward pivotal movement. This is accomplished by the simple expedient of providing a mortise slot 36 in each of the top side rails 18, 19 opening inwardly of the top side rails through the base of the rabbet 21 in each of the top side rails, the mortise slot being of a size to accommodate the hook formation 31 of the door spring 30 and being located at an intermediate position depthwise of the top side rails to assemble the hooked ends of the door spring 30 to the top side rails. It is only necessary to project the hook formation 31 into the mortise slot 36 and drive a nail 37 through the top side rail at a position such that the shank of the nail will lie within the bight of the hook formation 31 and retain the hook formation at a position fully projected into the mortise slot. With this construction, it will be noted that the upper and lower walls of the mortise slot 36 are in close proximity to the surface of the wire forming the door spring 30 and will maintain the hook formation 31 in a substantially flat position in a horizontal plane to restrain the door spring against turning.

An alternate construction for anchoring the door spring 30 to the top side rails 18, 19 is illustrated in FIGURES 6 and 7, wherein a bored recess 38 extending upwardly through the bottom surface of each of the top side rails 18, 19 is formed in the top side rails and extends to a height above the level of the ledge 22 a sufficient distance to accommodate the thickness of the door spring 30. With this construction, the hook formation 31 of the door spring 30 is anchored in place within the bored recess 38 by means of a nail 39 which extends within the bight of the hook and is bent over one leg of the hook formation 31 or a suitable heavy staple, and a staple 40 which is driven over the hook formation adjacent the free end thereof. The purpose of the staple 40 is to secure the hook formation 31 flat against the top wall of the bored recess 37 to hold the hook formation and door spring 30 against turning, since the hook formation 31 is not held between two closely adjacent flat horizontal surfaces as it was in the first described embodiment.

Still another construction for anchoring the hook formation of the door spring 30 is disclosed in FIGURES 8 and 9 wherein an upwardly and inwardly opening U-shaped recess 41 is formed in the inner edge portions of the top side rails 18, 19 extending upwardly from the level of the ledge 22, the hook formation in this instance being secured by a bent nail or staple 39' and a staple 40' occupying positions corresponding to the elements 39 and 40 in the FIGURE 6 embodiment, and an additional broad staple 42 extending over the shank portion of hook formation 31 remote from the bight of the hook formation to further limit turning of the door spring 30 while accommodating the necessary range of flexure of the door spring 30.

By the above construction wherein the wide top side rails having a rabbeted inner edge displace the outer marginal capping and the inwardly spaced capping strips and door-supporting sticks of the prior art construction drastic reduction in the number of nails and in the time involved in the nailing procedure are effected, and weak readily destructible regions of the marginal side rails where they overlie the gaps between the transverse batten strips are eliminated. The wider top side rails have much greater resistance to bending in the direction of the width of the top side rails, so that they effectively resist pulling of the centers of the side pieces together by the binding chains trained over the coops to bind them for transportation. Such pulling of the centers of the marginal capping strips and top dowel framing members together in the prior art constructions eventually introduce a set into the members which reduces the width of the door opening and prevents proper closure of the door. Also, the arrangement of the rabbets in the inner edges of the top side rails provides a simple door support construction and more effective support of the cross strips 26 to provide a much stronger top for the coop.

The expedients herein disclosed for anchoring the ends of the door spring 30 in the top side rails permit accurate and efficient assembly of these components and securely hold the door spring against upward tilting or bending when the door is in closed position which would cause the edge of the door strip 28 adjacent the hinge to be elevated slightly above the top plane of the cross pieces 26 and top rails 18, 19, 23 and 24 and provide an obstruction which would prevent sliding of one coop over the other and would increase the possibility of destruction of the door.

While the above description specifically discloses practical embodiments of the invention, it will be understood by those skilled in the art that the specific details of construction and arrangement of parts, as shown, are by way of example and other rearrangements of parts cooperable to carry out the inventive concept are to be regarded as within the purview of the invention.

What is claimed is:

1. A poultry coop comprising a rectangular enclosure including a bottom, a top, and side and end walls, said side and end walls being formed of narrow elongated top and bottom side and end frame members secured together to form rectangular top and bottom frames and vertical dowels secured in said frame members and extending therebetween, said top having a rectangular door opening therein and a door formed of transverse slats and door frame members hingedly supported for rotation upwardly about an axis adjacent a transverse edge of the door opening from a closed position flush with the top, said top including a pair of side rail members extending the length of the top frame overlying and secured to the top side frame members and the adjacent portion of the top end frame members and transversely disposed cross strips extending between and secured to said side rail members, said side rail members being of substantially greater width than said side frame members to dispose the outer longitudinal edge of each side rail member in alignment with the outer edge of its adjacent side frame member and its inner edge forming the longitudinal edge of the door opening, and said inner edge of each side rail member having a rabbet of the depth of said door slats in the upper corner thereof providing a supporting ledge for the ends of said door slats when the door is in closed position and for the ends of said cross strips with the upper surfaces of said door slats and cross strips lying flush with the upper surfaces of said top side rails, said door having latching means including projecting means at the free edge thereof and a stationary formation on said top adjacent said door opening, said door being hingedly coupled to an elongated, bowed spring wire resiliently urging said projecting means toward said stationary formation when said door approaches closed position, said spring wire having a hook formation on each end thereof, and said top side rails each having a recess opening inwardly of the rabbeted edge thereof in transverse alignment with said spring wire, the hook formations on said spring wire being seated in said recesses and anchored therein by nail means extending through the bight of the hook formation, and means holding said hook formations in a fixed plane restraining said spring wire against rotation.

2. The combination recited in claim 1, wherein each of said recesses in said top side rails for receiving the hook formations on the ends of said spring wire is a substantially rectangular mortise slot opening endwise through the base of the rabbet in the associated top side rail, said mortise slot having a height approximating the diameter of the spring wire and including a bottom wall which is flush with the upper surface of the ledge of the rabbet and a top wall coacting with said bottom wall to restrain said hook formation against rotation about a horizontal axis.

3. The combination recited in claim 1, wherein each of said recesses in said top side rails for receiving the hook formations on the ends of said spring wire is a downwardly opening bored recess extending upwardly from the bottom surface of the associated top side rail to a distance above the upper surface of the ledge of the rabbet corresponding to the diameter of the spring wire, the said bored recess having an opening communicating laterally through the base of the rabbet to receive the hook formation of the spring wire therethrough, and said means holding said hook formations in a fixed plane including securing means driven into said top side rails and extending over a portion of the hook formation at a position spaced from said nail means to hold the hook formation flat against a surface of said bored recess.

4. The combination recited in claim 1, wherein each of said recesses in said top side rails for receiving the hook formations on the ends of said spring wire is an upwardly opening bored recess extending downwardly from the top surface of the associated top side rail to the level of the ledge of the rabbet and opening laterally through the base of the rabbet, said means holding said hook formations in a fixed plane including securing means driven into the top side rail and extending over an end portion of the hook formation at a location spaced from said nail means to retain the hook formation flat against the bottom surface of the bored recess, and a staple driven into the top side rail and extending over a portion of the spring wire extending between the bights of the hook formations and located within the bored recess to restrain the spring wire against movement away from the bottom surface of the bored recess, said staple having legs spaced laterally a sufficient distance to accommodate sufficient movement of the spring wire in the plane of the top of the coop to permit latching and unlatching of the door.

5. A poultry coop comprising a rectangular enclosure including a bottom, a top, and side and end walls, said top having a rectangular door opening therein and a door formed of transverse slats and door frame members hingedly supported for rotation upwardly about an axis adjacent a transverse edge of the door opening from a closed position flush with the top, said top including a pair of rail members extending the length of the top secured to the end walls with inner edges thereof forming the longitudinal edges of the door opening and transversely disposed cross members extending between and secured to said rail members, and said inner edge of each rail member having a rabbet of the depth of said door slats in the upper corner thereof providing a supporting ledge for the ends of said door slats when the door is in closed position with the upper surfaces of said door slats lying flush with the upper surfaces of said rails, said door having latching means including projecting means at the free edge thereof and a stationary formation on said top adjacent said door opening, said door being hingedly coupled to an elongated, bowed spring wire resiliently urging said projecting means toward said stationary formation when said door approaches closed position, said spring wire having a hook formation on each end thereof, and said rails each having a recess opening inwardly of the rabbeted edge thereof in transverse alignment with said spring wire, the hook formations on said spring wire being seated in said recesses and anchored therein by nail means extending through the bight of the hook formation, and means holding said hook formation in a fixed plane restraining said spring wire against rotation.

6. The combination recited in claim 5, wherein each of said recesses in said rails for receiving the hook formations on the ends of said spring wire is a substantially rectangular mortise slot opening endwise through the base of the rabbet in the associated rail, said mortise slot having a height approximating the diameter of the spring wire and including a bottom wall which is flush with the upper surface of the ledge of the rabbet and a top wall coacting with said bottom wall to restrain said hook formation against rotation about a horizontal axis.

7. The combination recited in claim 1, wherein each of said recesses in said rails for receiving the hook formations on the ends of said spring wire is a downwardly opening bored recess extending upwardly from the bottom surface of the associated rail to a distance above the upper surface of the ledge of the rabbet corresponding to the diameter of the spring wire, the said bored recess having an opening communicating laterally through the base of the rabbet to receive the hook formation of the spring wire therethrough, and said means holding said hook formations in a fixed plane including securing means driven into said rails and extending over a portion of the hook formation at a position spaced from said nail means to hold the hook formation flat against a surface of said bored recess.

8. The combination recited in claim 5, wherein each of said recesses in said rails for receiving the hook formations on the ends of said spring wire is an upwardly opening bored recess extending downwardly from the top surface of the associated rail to the level of the ledge of the rabbet and opening laterally through the base of the rabbet, said means holding said hook formations in a fixed plane including securing means driven into the rail and extending over an end portion of the hook formation at a location spaced from said nail means to retain the hook formation flat against the bottom surface of the bored recess, and a staple driven into the rail and extending over a portion of the spring wire extending between the bights of the hook formations and located within the bored recess to restrain the spring wire against movement away from the bottom surface of the bored recess, said staple having legs spaced laterally a sufficient distance to accommodate sufficient movement of the spring wire in the plane of the top of the coop to permit latching and unlatching of the door.

References Cited in the file of this patent

UNITED STATES PATENTS

| | | |
|---|---|---|
| 1,697,379 | Arduser | Jan. 1, 1928 |
| 2,565,765 | Frederick | Aug. 28, 1951 |
| 2,620,204 | Hammond | Dec. 2, 1952 |
| 2,843,284 | Carey | July 15, 1958 |